United States Patent
Song et al.

(10) Patent No.: US 8,037,064 B2
(45) Date of Patent: Oct. 11, 2011

(54) METHOD AND SYSTEM OF SELECTING LANDING PAGE FOR KEYWORD ADVERTISEMENT

(75) Inventors: Ki Ho Song, Seoul (KR); Minuk Kim, Seoul (KR); Byounghak Kim, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 389 days.

(21) Appl. No.: 12/058,617

(22) Filed: Mar. 28, 2008

(65) Prior Publication Data

US 2008/0243797 A1     Oct. 2, 2008

(30) Foreign Application Priority Data

Mar. 30, 2007   (KR) ......................... 10-2007-0031534

(51) Int. Cl.
  G06F 7/00   (2006.01)
  G06F 17/30   (2006.01)
(52) U.S. Cl. .................. 707/726; 705/14.51; 705/14.54
(58) Field of Classification Search .......................... None
  See application file for complete search history.

(56) References Cited

U.S. PATENT DOCUMENTS

| | | | |
|---|---|---|---|
| 2004/0267725 A1* | 12/2004 | Harik | 707/3 |
| 2005/0033641 A1* | 2/2005 | Jha et al. | 705/14 |
| 2005/0222901 A1* | 10/2005 | Agarwal et al. | 705/14 |
| 2005/0222982 A1* | 10/2005 | Paczkowski et al. | 707/3 |
| 2006/0041536 A1* | 2/2006 | Scholl et al. | 707/3 |
| 2006/0136378 A1* | 6/2006 | Martin | 707/3 |
| 2006/0277102 A1* | 12/2006 | Agliozzo | 705/14 |
| 2006/0294124 A1* | 12/2006 | Cho | 707/101 |
| 2007/0016473 A1* | 1/2007 | Anderson et al. | 705/14 |
| 2007/0016480 A1* | 1/2007 | Lee | 705/14 |
| 2007/0156520 A1* | 7/2007 | Sharma | 705/14 |
| 2007/0198339 A1* | 8/2007 | Shen et al. | 705/14 |
| 2007/0239524 A1* | 10/2007 | Tewahade | 705/14 |
| 2007/0239530 A1* | 10/2007 | Datar et al. | 705/14 |
| 2007/0271392 A1* | 11/2007 | Khopkar et al. | 709/245 |
| 2007/0271511 A1* | 11/2007 | Khopkar et al. | 715/540 |
| 2008/0021878 A1* | 1/2008 | Jeong | 707/3 |
| 2008/0027798 A1* | 1/2008 | Ramamurthi et al. | 705/14 |

FOREIGN PATENT DOCUMENTS

| | | |
|---|---|---|
| KR | 10-2007-0007131 | 1/2007 |
| WO | 2005/006143 | 1/2005 |
| WO | 2005/033861 | 4/2005 |

OTHER PUBLICATIONS

Office Action issued on Jul. 11, 2008 to corresponding Korean application, 10-2007-0031534.

* cited by examiner

*Primary Examiner* — Kuen Lu
*Assistant Examiner* — Augustine Obisesan
(74) *Attorney, Agent, or Firm* — H.C. Park & Associates, PLC

(57) ABSTRACT

A method and system for displaying a keyword advertisement through retrieval of an optimal landing page associated with a detailed keyword, and displaying the retrieved landing page for a user, instead of displaying a non-specific landing page associated with the advertisement keyword included in the detailed keyword. A method of displaying a keyword advertisement includes: receiving from a user a detailed keyword that includes one or more advertisement keywords purchased by an advertiser and character strings; dynamically retrieving a landing page according to the received detailed keyword; and displaying page information of the landing page for the user.

24 Claims, 8 Drawing Sheets

METHOD AND SYSTEM OF SELECTING LANDING PAGE FOR KEYWORD ADVERTISEMENT

CROSS-REFERENCE TO RELATED APPLICATION

This application claims the benefit of Korean Patent Application No. 10-2007-0031534, filed on Mar. 30, 2007, in the Korean Intellectual Property Office, the disclosure of which is incorporated herein by reference.

BACKGROUND

1. Field

The present disclosure relates to a method and system for displaying a keyword advertisement.

2. Discussion of Related Technology

When an advertisement or an advertisement agent registers a keyword that is estimated to most effectively express its website, company, or product, at a search portal site, and a user enters a search word into an input window and then performs searching, a keyword advertisement is an advertisement region for displaying, as a search result, an advertisement of an advertiser that purchases a keyword corresponding to the search word.

In the keyword advertisement, when displaying the search result according to entering of the search word, the search result may include Title and Description (T&D) information and Universal Resource Locator (URL) address information of a representative page (keyword-linked page) of the advertisement or the advertisement site of the advertiser.

The URL address information generally relates to the representative page of the advertisement or the advertisement site of the advertiser. For example, when the user enters a search word such as "nike MAX360", the representative page of the advertisement or the advertisement site of the advertiser that purchases a corresponding keyword such as "nike" or "nike MAX" may be linked and displayed. In this case, representative URL address information, that is, a homepage may be non-specifically linked. Therefore, the user may need to navigate through many pages to retrieve "nike MAX360" in the linked homepage.

Also, when the advertiser does not purchase keyword "nike MAX360", advertisement information of the advertiser is not even displayed. Accordingly, the advertiser may not achieve any advertising effect and the user may not obtain the user's desired information.

The foregoing discussion is to provide general background information, and does not constitute an admission of prior art.

SUMMARY

One aspect of the invention provides a method of selecting a landing page in response to a query. The method comprises: providing a query comprising a text string; identifying, in the text string, one or more of a plurality of advertisement keywords that are subject to a keyword advertisement for generating at least one anchor tag each linking to a keyword-linked page in response to a search using one of the plurality of advertisement keywords subject to the keyword advertisement; locating one or more keyword-linked pages for each identified advertisement keyword; locating one or more anchor-tagged pages that are linked by an anchor tag on each keyword-linked page; generating a plurality of values, each of which is assigned to a combination of one keyword-linked page and one anchor-tagged page linked to the one keyword-linked page, wherein each value is based on the number of occurrences of the query on one keyword-linked page and its anchor-tagged pages; and ranking the plurality of values of the one or more located anchor-tagged pages so as to select a landing page.

In the foregoing method, generating may comprise: counting the number of occurrences of the query on one keyword-linked page and all of its anchor-tagged pages, thereby providing a first count for each combination of one keyword-linked page and all of its anchor-tagged pages; counting the number of occurrences of the query on each anchor-tagged page linked from each keyword-linked page, thereby providing a second count for each anchor-tagged page linked to one keyword-linked page; and performing a mathematical operation using the first and second counts for each anchor-tagged page linked to one keyword-linked page, thereby generating each of the plurality of values. The mathematical operation may comprise at least one selected from the group consisting of a summation of the first and second counts, a multiplication of one or more predetermined coefficients with at least one of the first and second counts, and a multiplication of the first count with the second count, thereby generating a value for each anchor-tagged page linked to one keyword-linked page. The method may further comprise: counting the number of occurrences of the query on each of the one or more located keyword-linked pages, thereby providing a third count for each keyword-linked page; performing a mathematical operation using the first and third counts for each keyword-linked page, thereby generating one or more additional values, each of which is assigned to one of the located keyword-linked pages; and wherein ranking ranks the plurality of values along with the one or more additional values so as to select the landing page.

The one or more keyword-linked pages may comprise a first keyword-linked page and a second keyword-linked page, wherein the first keyword-linked page is linked to a first group of anchor-tagged pages by anchor tags appearing on the first keyword-linked page, wherein the second keyword-linked page is linked to a second group of anchor-tagged pages by anchor tags appearing on the second keyword-linked page, wherein the combination of the first keyword-linked page and the first group of anchor-tagged pages is provided with a first number for the first count, wherein the combination of the second keyword-linked page and the second group of anchor-tagged pages is provided with a second number for the first count. The one or more keyword-linked pages may comprise a first keyword-linked page and a second keyword-linked page, wherein the first keyword-linked page is linked to a first group of anchor-tagged pages by anchor tags appearing on the first keyword-linked page, wherein the second keyword-linked page is linked to a second group of anchor-tagged pages by anchor tags appearing on the second keyword-linked page, wherein each anchor-tagged page of the first group has a number for the second count, wherein a combination of the first keyword-linked page and an anchor-tagged page of the first group is provided with one of the plurality of values.

Generating may comprise: counting the number of occurrences of the query on each of the one or more located keyword-linked pages, thereby providing a first count for each keyword-linked page; counting the number of occurrences of the query on each anchor-tagged page linked from each keyword-linked page, thereby providing a second count for each anchor-tagged page linked to one keyword-linked page; performing a mathematical operation using the first and second counts for each anchor-tagged page linked to one keyword-linked page, thereby generating each of the plurality of values. The mathematical operation may comprise at least one selected from the group consisting of a summation of the first and second counts, a multiplication of one or more predetermined coefficients with at least one of the first and second counts, and a multiplication of the first count with the second count, thereby generating a value for each anchor-tagged page linked to one keyword-linked page. Generating further may comprise: performing a mathematical operation using the first count for each keyword-linked page, thereby generating one or more additional values, each of which is assigned to one of the located keyword-linked pages; and wherein ranking may rank the plurality of values along with the one or more additional values so as to select the landing page. Performing the mathematical operation using the first count may comprise squaring the first count for each keyword-linked page.

The one or more keyword-linked pages may comprise a first keyword-linked page and a second keyword-linked page, wherein the first keyword-linked page is linked to a first group of anchor-tagged pages by anchor tags appearing on the first keyword-linked page, wherein the second keyword-linked page is linked to a second group of anchor-tagged pages by anchor tags appearing on the second keyword-linked page, wherein the first keyword-linked page is provided with a first number for the first count, wherein the second keyword-linked page is provided with a second number for the first count. The one or more keyword-linked pages may comprise a first keyword-linked page and a second keyword-linked page, wherein the first keyword-linked page is linked to a first group of anchor-tagged pages by anchor tags appearing on the first keyword-linked page, wherein the second keyword-linked page is linked to a second group of anchor-tagged pages by anchor tags appearing on the second keyword-linked page, wherein each anchor-tagged page of the first group has a number for the second count, wherein a combination of the first keyword-linked page and an anchor-tagged page of the first group is provided with one of the plurality of values.

The foregoing method may further comprise: determining each of the one or more located keyword-linked pages is part of either an auction website or an Internet shopping mall; and wherein if a first one of the one or more keyword-linked page is part of either auction website or an Internet shopping mall, locating one or more anchor-tagged pages that are linked on the first keyword-linked page may comprise referring to pre-stored information comprising anchor tags appearing on component pages of the auction website or Internet shopping mall. The method may further comprise: locating an auction website or Internet shopping mall; analyzing component pages of the auction website or Internet shipping mall; producing information comprising anchor tags appearing on the component pages; and storing the information in a memory.

Still in the foregoing method, the plurality of advertisement keywords are sold to advertisers for the keyword advertisement, which may be performed such that, in response to a search using one of the plurality of advertisement keywords, a keyword-linked page associated with the advertisement keyword is anchor-tagged on a search result page for clicking through to the keyword-linked page. The method may further comprise receiving the query as a user input. The method may further comprise: receiving a text input from a user; and preprocessing the text input so as to generate the query comprising the text string. The landing page may be selected among the one or more keyword-linked pages and their anchor-tagged pages. The landing page may have the highest value among the one or more keyword-linked pages and their anchor-tagged pages. The method may further comprise: sending, subsequent to ranking, data for displaying a query response page on a user terminal in response to the query, wherein the query response page may comprise an anchor-tag linking to the landing page. The method may further comprise: sending, subsequent to ranking, a command to a user terminal for opening the landing page.

Another aspect of the invention provides a system for selecting a landing page in response to a query. The system comprises: means for identifying, in a query comprising a text string, one or more of a plurality of advertisement keywords that are subject to a keyword advertisement for generating at least one anchor tag each linking to a keyword-linked page in response to a search using one of the plurality of advertisement keywords subject to the keyword advertisement; means for locating one or more keyword-linked pages for each identified advertisement keyword; means for locating one or more anchor-tagged pages that are linked by an anchor tag on each keyword-linked page; means for generating a plurality of values, each of which is assigned to a combination of one keyword-linked page and one anchor-tagged page linked to the one keyword-linked page, wherein each value is based on the number of occurrences of the query on one keyword-linked page and its anchor-tagged pages; and means for ranking the plurality of values of the one or more located anchor-tagged pages so as to select a landing page.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
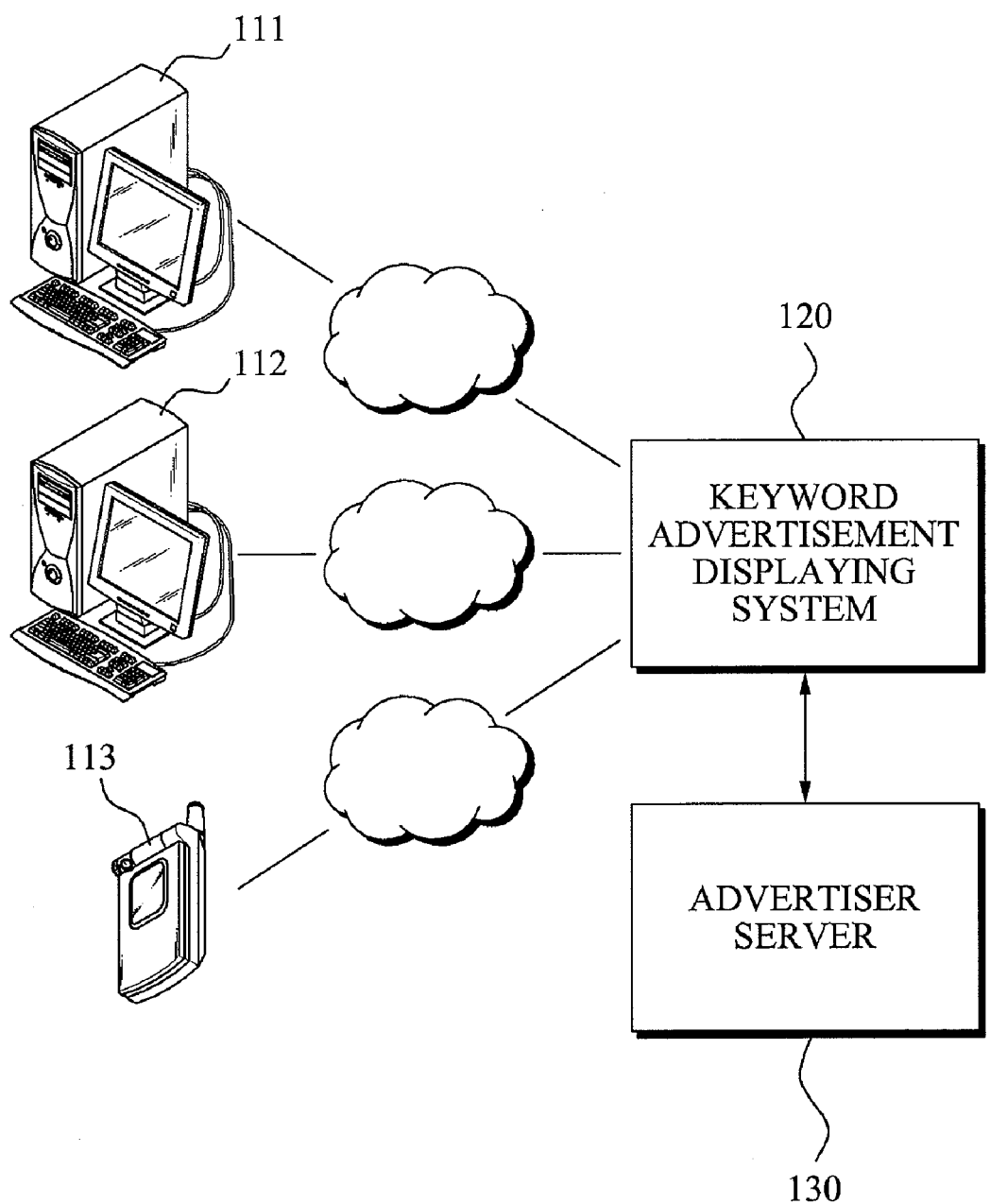
FIG. 1 is a schematic diagram for describing a method and system for displaying a keyword advertisement through retrieval of an optimal landing page according to one embodiment of the invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a schematic diagram for describing a method and system for displaying a keyword advertisement through retrieval of an optimal landing page according to one embodiment of the invention. As shown in FIG. 1, a keyword advertisement displaying system 120 may retrieve page information of an optimal landing page associated with a detailed keyword entered from any one of users 111, 112, and 113, and display the retrieved page information for the user. Here, a detailed keyword refers to a string of text including one or more terms that are subject to keyword advertisement.

The page information of the optimal landing page may be dynamically retrieved according to the detailed keyword and be displayed. In order to retrieve the page information of the optimal landing page, the keyword advertisement displaying system 120 may select a plurality of representative keywords (or advertisement keywords) included or associated with the detailed keyword and extract a plurality of pages associated with the plurality of representative keywords. The representative or advertisement keywords are those terms that have been purchased in advance by an advertiser for keyword advertisement, which links the advertisement keywords to advertiser's designated advertisement pages. The plurality of pages associated with the representative keyword may include the advertisement page. These pages associated with the representative keyword are also referred to as keyword-linked pages as they are linked to advertisement keywords.

A scheme of extracting the plurality of pages may be different depending on whether an advertisement site of the advertiser is a large advertisement site. According to one embodiment, when the advertisement site is the large advertisement site, the keyword advertisement displaying system 120 may extract correlation information between the representative keyword that have been purchased by an advertiser and a Universal Resource Locator (URL) of each of the pages through database cloning of an advertiser server 130. Also, the keyword advertisement displaying system 120 may analyze the plurality of pages and determine the optimal landing page.

Figure 2:
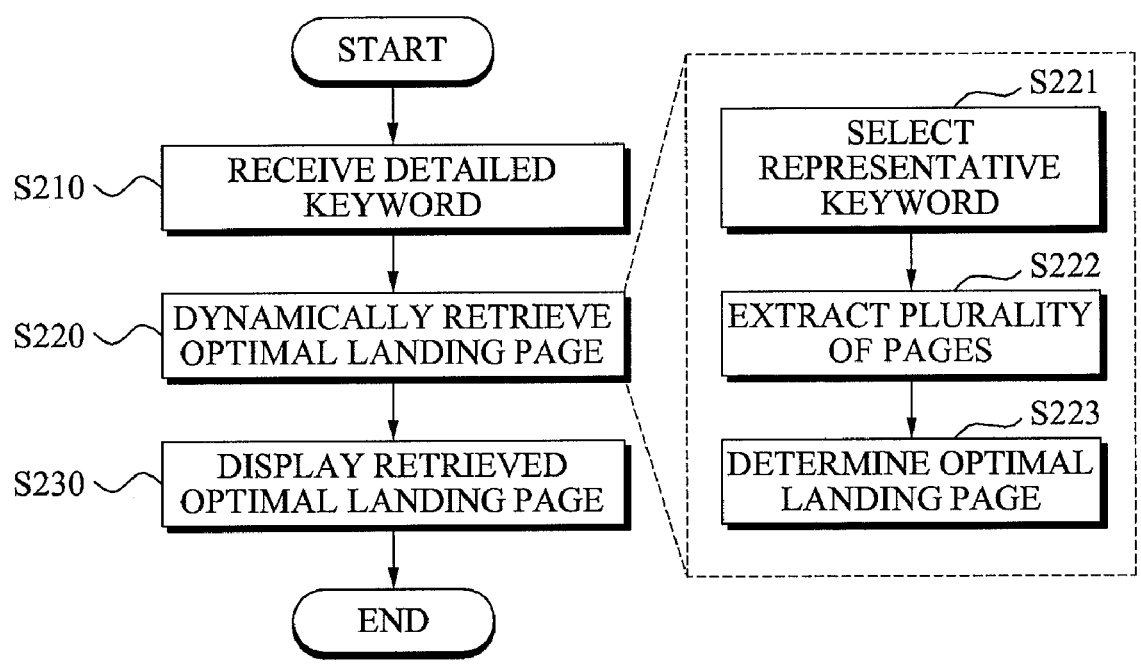
FIG. 2 is a flowchart illustrating a method of displaying a keyword advertisement through retrieval of an optimal landing page according to one embodiment of the invention.

Hereinafter, a method and system for displaying a keyword advertisement through retrieval of an optimal landing page will be described in detail with reference to FIGS. 2 through 8. FIG. 2 is a flowchart illustrating a method of displaying a keyword advertisement through retrieval of an optimal landing page according to one embodiment of the invention. As shown in FIG. 2, the method may be performed through operations S210 through S230.

In operation S210, a keyword advertisement displaying system may receive from a user a detailed keyword that includes a string of text including one or more terms that are subject to keyword advertisement. The detailed keyword may include all the character strings that constitute the representative keyword. More specifically, the detailed keyword may be the same as the representative keyword purchased by the advertiser and may further include a character string that is added to the representative keyword. For example, when the advertiser purchases keyword "nike", even the keyword "nike" may be the detailed keyword. Also, a character string may be added to "nike" and thus a character type such as "nike MAX" or "nike MAX360" may be the detailed keyword. According to one embodiment, when the single term "nike" is excluded but a character string related to "nike" is included in the purchased keyword, the single term "nike" may be the detailed keyword.

In the existing keyword advertisement, when the advertiser purchases the representative keyword, the advertiser may set a representative page (keyword-linked page) determined by the advertiser to be displayed for the user when the user enters the representative keyword into an input window. When the user enters a keyword including a character string of the representative keyword (advertisement keyword), the representative page associated with the representative keyword may be displayed for the user. However, according to one embodiment, when the user enters the representative keyword and the detailed keyword, the keyword advertisement displaying system may retrieve an optimal landing page and display the retrieved optimal landing page for the user. Through this, it is possible to maximize the advertising effect of the advertiser and to display optimal advertisement information for the user.

In operation S220, the keyword advertisement displaying system may dynamically retrieve an optimal landing page according to the entered detailed keyword. The landing page may be a page that the user initially views when clicking an advertisement or link (anchor tag) appearing on a search result page. The keyword advertisement displaying system may dynamically retrieve the optimal landing page. For this, the keyword advertisement displaying system may retrieve the optimal landing page according to a case-by-case scheme of the detailed keyword entered by the user. Referring to FIG. 2, operation S220 may include operations S221 through S223.

In operation S221, the keyword advertisement displaying system may select at least one representative keyword (advertisement keyword) associated with the entered detailed keyword. For this, in operation S221, the keyword advertisement displaying system may select, from the plurality of representative keywords purchased by the advertiser, at least one representative keyword that includes a character string constituting the detailed keyword. For example, when the user enters detailed keyword "nike MAX360", the character string included in the detailed keyword may be at least one of character strings such as "ni", "nike", "nike MAX", "MAX", "MAX360", "360", and "nike MAX360". The keyword advertisement displaying system may select a representative keyword that is same as the selected at least one character string. The representative keyword denotes the keyword purchased by the advertiser. Referring to the detailed keyword "nike MAX360", when the advertiser purchases "nike" and "nike MAX" as representative keywords, "nike" and "nike MAX" may be selected as representative keywords associated with the detailed keyword "nike MAX360".

In operation S222, the keyword advertisement displaying system may extract a plurality of pages associated with the selected representative keyword. The plurality of pages may include the representative page (keyword-linked page) that is displayed for the user when the user enters the representative keyword into a search window and the user clicks an anchor tagged advertisement displayed for the user as a search result. Also, the plurality of pages may include a page anchored to the representative page. Here, "anchored" denotes a link structure to link a particular page to another page. The page may include various contents and may also be a web page. Also, a content page may include a document, music, and moving picture content page. Operation S222 will be further described in detail with reference to FIG. 3.

In operation S223, the keyword advertisement displaying system may analyze the plurality of extracted pages and select the landing page. In order to display for the user page information of the selected optimal landing page according to the detailed keyword, the keyword advertisement displaying system may determine the optimal landing page based on analysis of the plurality of pages. Operation S223 will be further described in detail with reference to FIG. 4.

In operation S230, the keyword advertisement displaying system may display page information of the retrieved optimal landing page for the user. The page information of the optimal landing page may include a URL address of the optimal landing page and also may include a partial summary or a part of contents of the optimal landing page. Also, the keyword advertisement displaying system may directly expose the URL address of the optimal landing page and then directly display the optimal landing page for the user when the user clicks the URL address.

Figure 3:
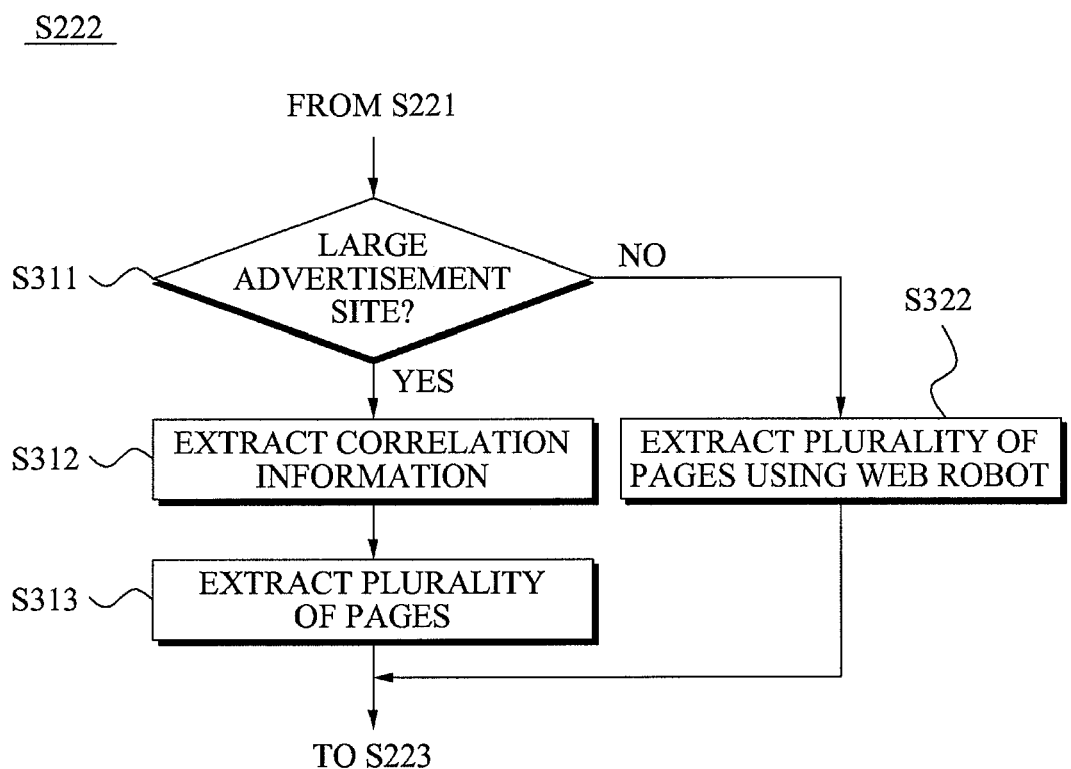
FIG. 3 is a flowchart illustrating an operation of extracting a plurality of pages associated with a representative keyword according to one embodiment of the invention.

FIG. 3 is a flowchart illustrating operation S222 of FIG. 2 according to one embodiment of the invention. Operation S222 may be performed through operations S311 through 313. According to one embodiment, operation S222 may be performed through operations S311 and S322.

In operation S311, the keyword advertisement displaying system may determine whether an advertisement site of an advertiser that registers the representative keyword is a large advertisement site. For this, the keyword advertisement displaying system may maintain a site database that includes advertisement site information of a plurality of advertisers that purchase the keyword. The keyword advertisement displaying system may determine whether the advertisement site of the advertiser that registers the representative keyword is the large advertisement site by referring to the site database. According to one embodiment, the keyword advertisement displaying system may determine whether the advertisement site of the advertiser that registers the representative keyword is the large advertisement site using an identifier of the advertisement site or the advertiser. The identifier may be determined according to various types of schemes. Generally, the large advertisement site may denote the advertisement site that auctions or sells various products.

When the advertisement site is the large advertisement site as a result of determination in operation S311, the keyword advertisement displaying system may extract correlation information between the representative keyword and a URL of each page through database cloning in operation S312. The database may maintain the large advertisement site of the advertiser. Through the database cloning, the keyword advertisement displaying system may extract the correlation information between the representative keyword (advertisement) purchased by the advertiser and the URL of each of pages included in the large advertisement site. The correlation information may include anchored structure information between the representative keyword and the plurality of pages. For example, when the advertiser of the large advertisement site purchases the keyword "nike" and a page directly linked to an advertisement of the representative keyword "nike" is a representative page (keyword-linked page), the keyword advertisement displaying system may extract correlation information between the representative keyword "nike" and a URL of each of a plurality of pages that include the page anchored to the representative page. Generally, the advertiser of the large advertisement site purchases hundreds of representative keywords.

In operation S313, the keyword advertisement displaying system may extract a plurality of pages associated with the representative keyword based on the extracted correlation information. More specifically, when extracting the plurality of pages in operation S313, the plurality of pages may include a representative page that is directly linked to the representative keyword, a page that is linked to the representative page, and a page that is re-linked to the linked page. As described above, it is possible to extract all of the plurality of pages associated with the representative keyword based on the correlation information. When a plurality of representative keywords (advertisement keywords) exists, it is possible to extract a plurality of pages associated with each of the representative keywords. The plurality of pages may denote only pages that are directly linked to the representative keyword.

Conversely, when the advertisement site of the advertiser is not the large advertisement site as a result of the determination in operation S311, the keyword advertisement displaying system may download and extract the plurality of pages using a web robot in operation S322. More specifically, the plurality of pages may be associated with the representative keyword. When the advertisement site of the advertiser that purchases the representative keyword is not the large advertisement site, the plurality of pages may be downloaded and extracted using the web robot. The web robot may denote a web page collecting program. The web robot may travel the Internet along links, find a link of the advertisement site that is not the large advertisement site, via any path, and collect information about the plurality of pages. The keyword advertisement displaying system may download and extract the plurality of pages based on the collected information.

As described above, the keyword advertisement displaying system may improve the efficiency in extracting the plurality of pages by changing an extraction scheme of the plurality of pages depending on whether the advertisement site of the advertiser is the large advertisement site. Also, it is possible to find all the pages included in the large advertisement site without using the web robot. In the case of a site that is not the large advertisement site, the database cloning may be discarded and thus, it is possible to prevent overloads of the keyword advertisement displaying system caused by the database cloning.

Figure 4:
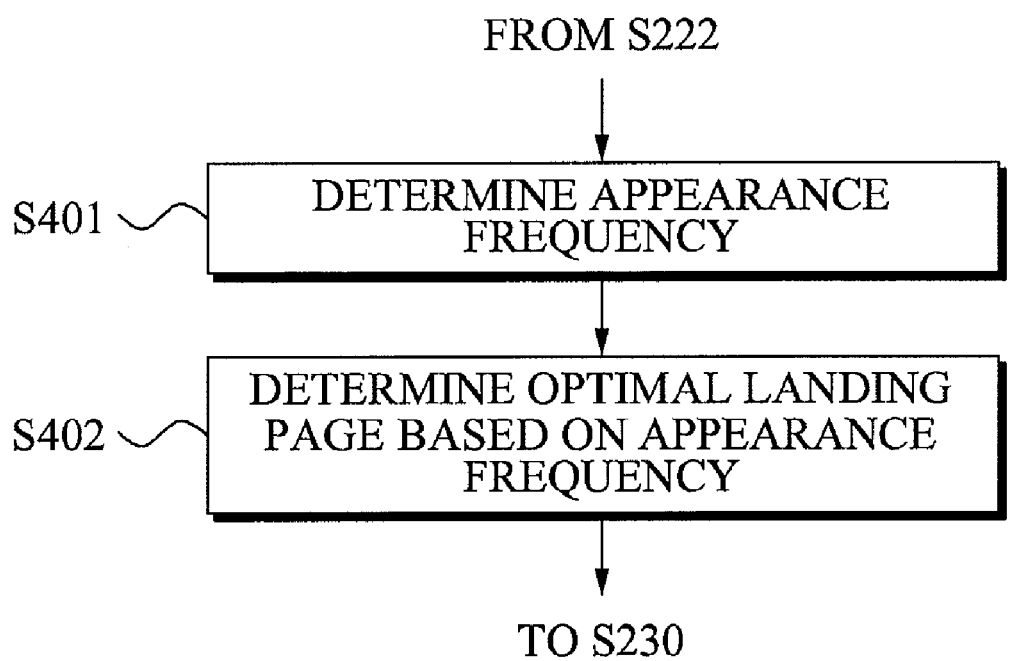
FIG. 4 is a flowchart illustrating an operation of analyzing a plurality of extracted pages and determining an optimal landing page according to one embodiment of the invention.

FIG. 4 is a flowchart illustrating operation S223 of FIG. 2 according to one embodiment of the invention. Operation S223 may be performed through operations S401 and S402.

In operation S401, the keyword advertisement displaying system may determine an appearance frequency of the detailed keyword in each of the extracted pages. The appearance frequency may include information about a number of times that the detailed keyword appears in each of the extracted pages, and also may include a result value that is computed based on the information according to a predetermined computing scheme. Various types of computing schemes or mathematical operations may be used. When computing the appearance frequency, the keyword advertisement displaying system may include an operation of determining whether an appearance of the detailed keyword is valid. Whether the appearance of the detailed keyword is valid may be determined according to a scheme of determining whether the detailed keyword includes a character string constituting the detailed keyword and the appearance of the character string is logically meaningful or grammatically valid. Operation S401 will be described in detail with reference to FIG. 5.

In operation S402, the keyword advertisement displaying system may determine the optimal landing page based on the determined appearance frequency. For this, the keyword advertisement displaying system may compare appearance frequencies of the detailed keyword in the plurality of pages and determine, as the optimal landing page, a page with a highest value for appearance frequency. Specifically, the page with the highest appearance frequency may be determined as the optimal landing page. However, it is only an example and thus the invention is not limited thereto. Specifically, the invention may include all the schemes of determining the optimal landing page.

Figure 5:
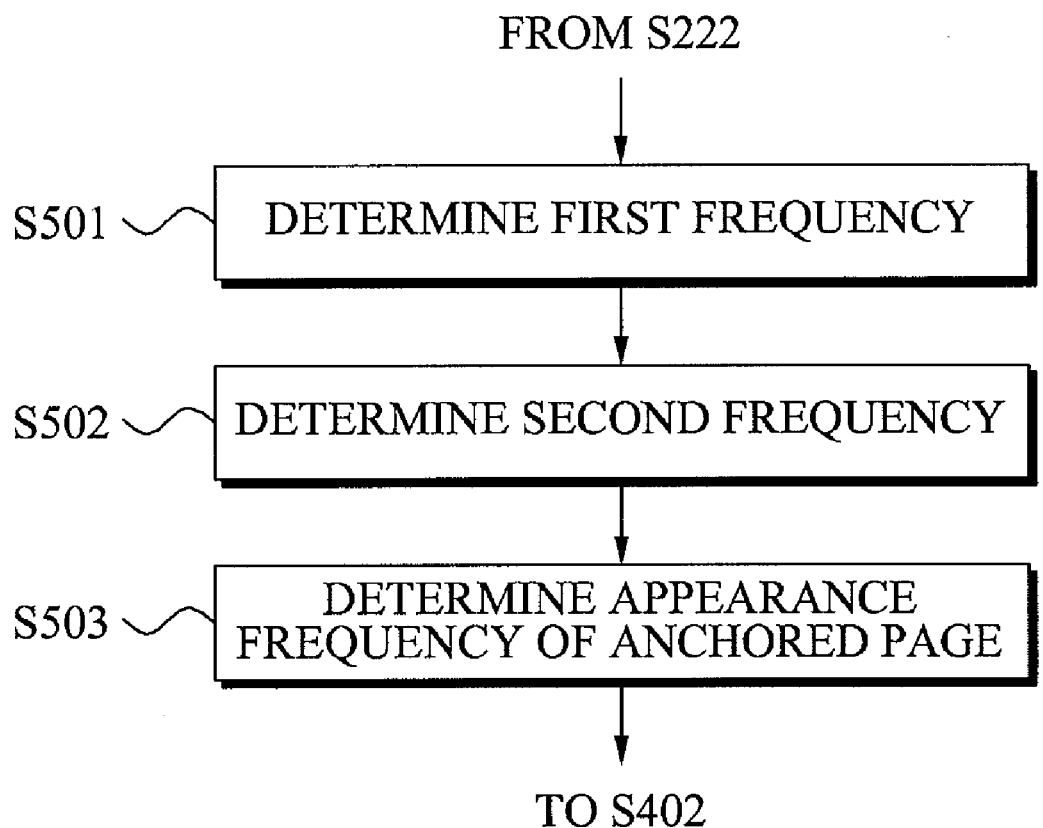
FIG. 5 is a flowchart illustrating an operation of determining an appearance frequency of a detailed keyword in each of extracted pages according to one embodiment of the invention.

FIG. 5 is a flowchart illustrating operation S401 of FIG. 4 according to one embodiment of the invention. Operation S401 may be performed through operations S501 through S503.

In operation S501, the keyword advertisement displaying system may count the appearance frequency or occurrences of the detailed keyword in each of the pages and determine the counted appearance frequency as a first frequency. The keyword advertisement displaying system may count the appearance frequency of the detailed keyword in each of all the extracted pages. The pages are associated with the representative keyword. Also, the plurality of pages may include the representative page and also may include all the pages that are anchored to the representative page.

In operation S502, the keyword advertisement displaying system may count the appearance frequency or occurrences of the detailed keyword in a page anchored to the page of which the first frequency is determined and determine the counted appearance frequency as a second frequency. More specifically, the page of which the first frequency is determined may be included in the plurality of pages associated with the representative keyword. The keyword advertisement displaying system may count the appearance frequency of the detailed keyword in the page anchored to the page of which the first page is determined, and may determine the counted appearance frequency as the second frequency of the anchored page. The optimal landing page may be selected from a plurality of pages of which the second frequency is determined.

In operation S503, the keyword advertisement displaying system may determine the appearance frequency of the anchored page based on the first frequency and the second frequency. For this, in operation S503, the keyword advertisement displaying system may multiply the first frequency by the second frequency and determine the result of the multiplication as the appearance frequency of the anchored page. In the alternative, the keyword advertisement displaying system uses other types of mathematical operations using at least the first and second frequencies to determine the appearance frequency, a numerical value. For example, the other mathematical operation can be at least one selected from the group consisting of a summation of the first and second counts, a multiplication of one or more predetermined coefficients with at least one of the first and second counts, and a multiplication of the first count with the second count, thereby generating a value for each anchor-tagged page linked to one keyword-linked page. The keyword advertisement displaying system may determine the appearance frequency based on the first frequency and/or the second frequency. In this instance, the keyword advertisement displaying system may determine the first frequency as the appearance frequency. Also, the keyword advertisement displaying system may determine the second frequency as the appearance frequency.

As described above, according to one embodiment, the keyword advertisement displaying system may multiply the first frequency by the second frequency and determine the result of the multiplication as the appearance frequency of the anchored page. In another embodiment, at least one of the first and second frequencies may be multiplied by one or more predetermined coefficients. As discussed above, the multiplication can be replaced with any other mathematical operations to provide a proper value indicative of relevance of the page to the detailed keyword. According to one embodiment, the keyword advertisement displaying system may add the first frequency and the second frequency, and determine the result of the addition as the appearance frequency of the anchored page. Specifically, the keyword advertisement displaying system according to one embodiment may include various types of schemes of determining the appearance frequency using the first frequency and the second frequency.

In operations S501 through S503, the anchored page may be included in the plurality of pages associated with the representative page. More specifically, the plurality of pages described via operations S311 through S313 or via operations S311 through S322 of FIG. 3 may include the page that is anchored to the page of which the first frequency is counted.

Figure 6:
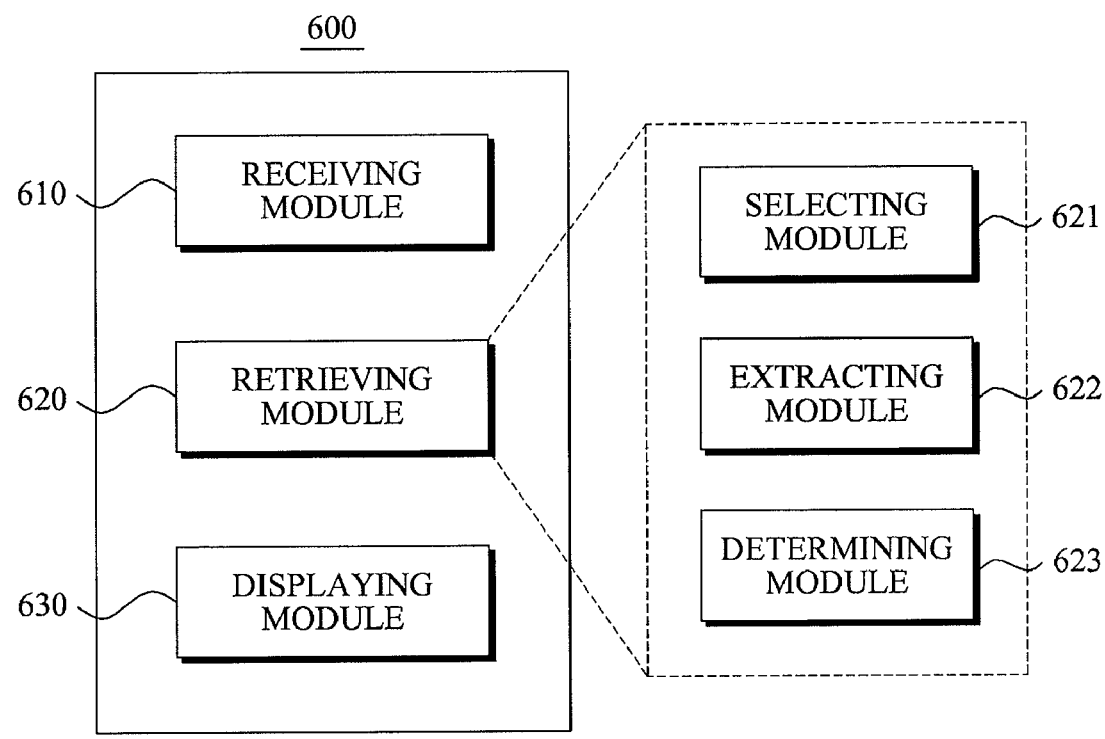
FIG. 6 is a block diagram illustrating a system for displaying a keyword advertisement through retrieval of an optimal landing page according to one embodiment of the invention.

FIG. 6 is a block diagram illustrating a system for displaying a keyword advertisement through retrieval of an optimal landing page according to one embodiment. As shown in FIG. 6, a keyword advertisement displaying system 600 may include a receiving module 610, a retrieving module 620, and a displaying module 630.

The receiving module 610 may receive from a user a detailed keyword that refers to a string of text including one or more terms that are subject to keyword advertisement. The detailed keyword may include all the character strings that constitute the representative keyword (advertisement keyword).

The retrieving module 620 may dynamically retrieve an optimal landing page according to the entered detailed keyword. As shown in FIG. 6, the retrieving module 620 may include a selecting module 621, an extracting module 622, and a determining module 623. The selecting module 621 may select at least one representative keyword (advertisement keyword) associated with the entered detailed keyword. The selecting module 621 may include a representative keyword selecting module (not shown) configured to select, from the plurality of representative keywords purchased by the advertiser, at least one representative keyword that includes a character string constituting the detailed keyword.

The extracting module 622 may extract a plurality of pages associated with the selected representative keyword. The determining module 623 may analyze the plurality of extracted pages and determine the optimal landing page. The displaying module 630 may display page information of the optimal landing page for the user.

Figure 7:
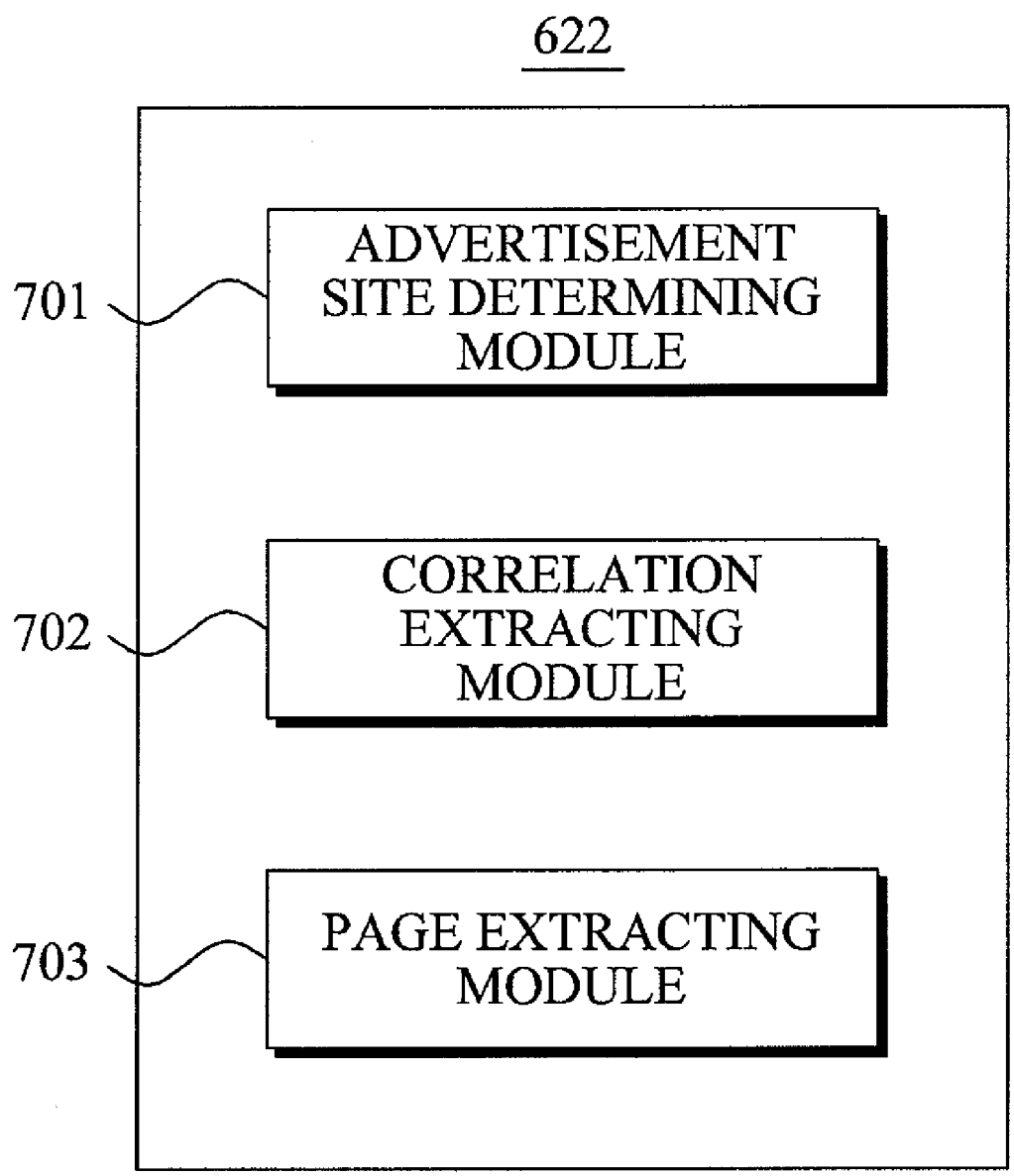
FIG. 7 is a block diagram illustrating an extracting module configured to extract a plurality of pages associated with a representative keyword according to one embodiment of the invention.

FIG. 7 is a block diagram illustrating the extracting module 622 configured to extract a plurality of pages associated with a representative keyword according to one embodiment of the invention. As shown in FIG. 7, the extracting module 622 may include an advertisement site determining module 701, a correlation extracting module 702, and a page extracting module 703.

The advertisement site determining module 701 may determine whether an advertisement site of an advertiser that registers the representative keyword is a large advertisement site. When the advertisement site is the large advertisement site, the correlation extracting module 702 may extract correlation information between the representative keyword and a URL of each page through database cloning. The page extracting module 703 may extract a plurality of pages associated with the representative keyword based on the extracted correlation information.

Conversely, when the advertisement site is not the large advertisement site, the page extracting module 703 may download and extract the plurality of pages using a web robot.

Figure 8:
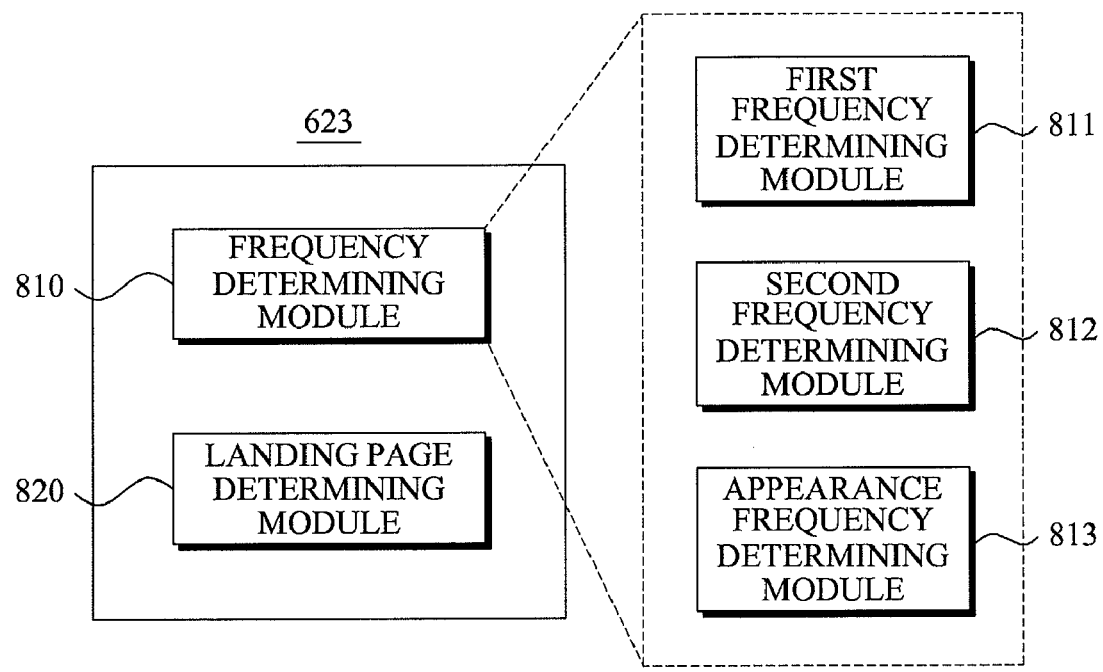
FIG. 8 is a block diagram illustrating a determining module configured to analyze a plurality of extracted pages and determine an optimal landing page according to one embodiment of the invention.

FIG. 8 is a block diagram illustrating the determining module 623 configured to analyze a plurality of extracted pages and determine an optimal landing page according to one embodiment of the invention. As shown in FIG. 8, the determining module 623 may include a frequency determining module 810 and a landing page determining module 820. The frequency determining module 810 may include a first frequency determining module 811, a second frequency determining module 812, and an appearance frequency determining module 813. The first frequency determining module 811 may count the appearance frequency of the detailed keyword in each of the pages and determine the counted appearance frequency as a first frequency. The second frequency determining module 812 may count the appearance frequency of the detailed keyword in a page anchored to the page of which the first frequency is determined and may determine the counted appearance frequency as a second frequency.

The appearance frequency determining module 813 may determine the appearance frequency of the anchored page based on the first frequency and the second frequency. For this, the appearance frequency determining module 813 may multiply the first frequency by the second frequency and may determine the result of the multiplication (a value) as the appearance frequency of the anchored page. Module 813 may use other mathematical operations from at least one selected from the group consisting of a summation of the first and second counts, a multiplication of one or more predetermined coefficients with at least one of the first and second counts, and a multiplication of the first count with the second count. According to one embodiment, the anchored page may include the plurality of pages associated with the representative keyword.

The landing page determining module 820 may determine the landing page based on the determined appearance frequency. The landing page determining module 820 may include a comparison determining module (not shown) configured to compare the appearance frequencies of the detailed keyword in the plurality of pages and determine, as the landing page, as a page with a highest appearance frequency.

The keyword advertisement displaying method according to the above-described exemplary embodiments of the invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the invention.

According to embodiments of the invention, there may be provided a method and system for displaying a keyword advertisement through retrieval of an optimal landing page that can receive from a user a detailed keyword that comprises of a string of text including one or more terms that are subject to keyword advertisement, dynamically retrieve an optimal landing page according to the detailed keyword, and display page information of the optimal landing page for the user and thereby can display for the user optimal landing page information associated with the detailed keyword that the user desires to view. Specifically, since an advertisement associated with the detailed keyword may be directly displayed for the user, it is possible to obtain user satisfaction and additional benefits and to more effectively improve the advertising effect for the advertiser.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for providing an optimal landing page associated with on-line marketing of products or services in response to a query, the method comprising:
receiving a query string;
identifying one or more keywords from the received query string, the identified keywords comprising a representative keyword and a detailed keyword that are associated with a keyword advertisement associated with the on-line marketing, the on-line marketing comprises generating a keyword-linked page and an anchor-tagged page to link one or more related pages of the keyword-linked page, wherein the representative keyword is correlated to the keyword-linked page and the detailed keyword is at least one remaining keyword excluding the representative keyword from the identified keywords;
determining a plurality of values with respect to each of the correlated representative keyword and the detailed keyword corresponding to the respective keyword-linked page and the anchor-tagged page, wherein each value is determined based on a number of occurrences of the correlated representative keyword and the detailed keyword based on the query string with respect to the keyword-linked page and the anchor-tagged page; and
providing an optimal landing page by ranking the determined values of one or more located anchor-tagged pages associated with the keyword-linked page.

2. The method of claim 1, wherein determining a plurality of values further comprises:
counting a number of occurrences of the query string associated with the keyword-linked page and all of anchor-tagged pages corresponding to the keyword-linked page to provide a first count;
counting a number of occurrences of the query string of each anchor-tagged page linked to the keyword-linked page to provide a second count; and
generating a plurality of values according to the counting by using the first count and the second count.

3. The method of claim 2, wherein counting a number of occurrences further comprises summing the first count and the second count, multiplying one or more predetermined coefficients with at least one of the first count and the second count, and multiplying the first count with the second count.

4. The method of claim 2, further comprising:
counting a number of occurrences of the query string of one or more keyword-linked pages to provide a third count for each keyword-linked page; and
generating additional values according to a calculation of the first count and the third count,
wherein the plurality of values along with the additional values are ranked to select the optimal landing page.

5. The method of claim 2, wherein the keyword-linked page comprises a first keyword-linked page and a second keyword-linked page, wherein the first keyword-linked page is linked to a first group of anchor-tagged pages, wherein the second keyword-linked page is linked to a second group of anchor-tagged pages, wherein the combination of the first keyword-linked page and the first group of anchor-tagged pages is provided with a first number for the first count, and wherein the combination of the second keyword-linked page and the second group of anchor-tagged pages is provided with a second number for the first count.

6. The method of claim 2, wherein one or more keyword-linked pages comprise a first keyword-linked page and a second keyword-linked page, wherein the first keyword-linked page is linked to a first group of anchor-tagged pages, wherein the second keyword-linked page is linked to a second group of anchor-tagged pages, wherein each anchor-tagged page of the first group has the second count, and wherein a combination of the first keyword-linked page and an anchor-tagged page of the first group is provided with one of the plurality of values.

7. The method of claim 1, wherein determining a plurality of values further comprises:
   counting a number of occurrences of the query string associated with each of the keyword-linked pages to provide a first count for each keyword-linked page;
   counting a number of occurrences of the query string associated with each anchor-tagged page linked from each keyword-linked page to provide a second count;
   generating each of the plurality of values according to the counting by using the first count and the second count for each anchor-tagged page linked to one keyword-linked page.

8. The method of claim 7, wherein generating a plurality of values according to the counting further comprises summing the first count and the second count, multiplying one or more predetermined coefficients with at least one of the first count and the second count, and multiplying the first count with the second count.

9. The method of claim 7, wherein generating a plurality of values further comprises:
   performing a mathematical operation using the first count for each keyword-linked page, to generate one or more additional values, each of the additional values is assigned to one of the keyword-linked pages; and
   wherein the plurality of values along with the additional values are ranked to select the landing page.

10. The method of claim 9, wherein performing the mathematical operation comprises squaring the first count for each keyword-linked page.

11. The method of claim 7, wherein the keyword-linked pages comprise a first keyword-linked page and a second keyword-linked page, wherein the first keyword-linked page is linked to a first group of anchor-tagged pages, wherein the second keyword-linked page is linked to a second group of anchor-tagged pages, wherein the first keyword-linked page is provided with a first number for the first count, and wherein the second keyword-linked page is provided with a second number for the first count.

12. The method of claim 7, wherein the keyword-linked pages comprise a first keyword-linked page and a second keyword-linked page, wherein the first keyword-linked page is linked to a first group of anchor-tagged pages, wherein the second keyword-linked page is linked to a second group of anchor-tagged pages, wherein each anchor-tagged page of the first group has a number for the second count, and wherein a combination of the first keyword-linked page and an anchor-tagged page of the first group is provided with one of the plurality of values.

13. The method of claim 1, further comprising:
   determining each of keyword-linked pages whether the keyword-linked page is either an auction website or an Internet shopping mall; and
   in response to the determination, providing one or more anchor-tagged pages that are linked on the first keyword-linked page which comprises information associated with anchor tags which link component pages of the auction website or the Internet shopping mall.

14. The method of claim 13, further comprising:
   locating an auction website or Internet shopping mall;
   analyzing component pages of the auction website or Internet shipping mall;
   providing information comprising anchor tags which link the component pages; and
   storing the provided information.

15. The method of claim 1, wherein one or more representative keywords are purchased by advertisers for a keyword advertisement associated with the on-line marketing, wherein the one or more representative keywords are identified to provide the keyword-linked page and the anchor-tagged page in response to receiving the query string for the optimal landing page associated with the keyword advertisement.

16. The method of claim 1, further comprising:
   receiving the query string as a user input.

17. The method of claim 1, further comprising:
   receiving a text input; and
   preprocessing the text input to generate the query string comprising the text string.

18. The method of claim 1, wherein the landing page is selected among the one or more keyword-linked pages and the anchor-tagged pages.

19. The method of claim 18, wherein the landing page has the highest value among the one or more keyword-linked pages and the anchor-tagged pages.

20. The method of claim 1, further comprising:
   sending a query response page on a user terminal in response to the query string, wherein the query response page comprises an anchor-tag linking to the landing page.

21. The method of claim 1, further comprising:
   sending a query response to a user terminal according to a ranking order to provide the optimized landing page.

22. A keyword advertisement system comprising one or more servers, the system comprising:
   a receiving module, coupled to a processor of the one or more servers, configured to receive a query string;
   an advertisement site determining module caused by the processor to identify one or more keywords from the received query string, the identified keywords comprising a representative keyword and a detailed keyword that are associated with a keyword advertisement which comprises generating a keyword-linked page and an anchor-tagged page to link one or more related pages of the keyword-linked page, wherein the representative keyword is correlated to a keyword-linked page of an advertiser and the detailed keyword is at least one remaining keyword excluding the representative keyword from the identified keywords;
   a determining module caused by the processor to determine a plurality of values with respect to each of the correlated representative keyword and the detailed keyword corresponding to the respective keyword-linked page and the anchor-tagged page, wherein each value is determined based on a number of occurrences of the correlated representative keyword and the detailed keyword based on the query string with respect to the keyword-linked page and the anchor-tagged pages; and
   a displaying module, coupled to the processor, configured to display an optimal landing page by ranking the determined values of one or more located anchor-tagged pages associated with the keyword-linked page.

23. The method of claim 1, wherein the detailed keyword is correlated to a keyword-linked page of an advertiser and the detailed keyword is correlated to string of texts of the products or services of the advertiser associated with the keyword advertisement.

24. The system of claim 22, wherein the detailed keyword is correlated to a keyword-linked page of an advertiser and the detailed keyword is correlated to string of texts of the products or services of the advertiser associated with the keyword advertisement.

* * * * *